US011010608B2

(12) United States Patent
Adam et al.

(10) Patent No.: US 11,010,608 B2
(45) Date of Patent: May 18, 2021

(54) SYSTEM AND METHOD FOR VEGETATION MANAGEMENT RISK ASSESSMENT AND RESOLUTION

(71) Applicant: Bayer CropScience LP, Research Triangle Park, NC (US)

(72) Inventors: Kevin Adam, Cary, NC (US); Kris C. Matson, Cary, NC (US); Mathew C. Nespeca, Raleigh, NC (US); Michael Owen, Summerfield, NC (US); J. Brent Slone, Beckley, WV (US); John M. Ridgeway, Fair Haven, NJ (US); Roland Maynard, Chapel Hill, NC (US)

(73) Assignee: Bayer CropScience LP, St. Louis, MO (US)

(*) Notice: Subject to any disclaimer, the term of this patent is extended or adjusted under 35 U.S.C. 154(b) by 114 days.

(21) Appl. No.: 16/419,241

(22) Filed: May 22, 2019

(65) Prior Publication Data
US 2019/0362147 A1 Nov. 28, 2019

Related U.S. Application Data

(60) Provisional application No. 62/676,302, filed on May 25, 2018.

(51) Int. Cl.
*G06K 9/00* (2006.01)
*G06F 16/29* (2019.01)
(Continued)

(52) U.S. Cl.
CPC ......... *G06K 9/00657* (2013.01); *G06F 16/29* (2019.01); *G06K 9/00711* (2013.01);
(Continued)

(58) Field of Classification Search
None
See application file for complete search history.

(56) References Cited

U.S. PATENT DOCUMENTS 7,046,841 B1   5/2006   Dow et al.
7,298,869 B1  11/2007   Abernathy
(Continued)

FOREIGN PATENT DOCUMENTS

CN   102033230 A    4/2011
CN   102288954 A   12/2011
(Continued)

OTHER PUBLICATIONS

Dalsted, Kevin, "Chapter 1: Introduction: Remote Sensing Techniques Detection, Surveillance, and Invasive", GIS Applications in Agriculture, Feb. 16, 2011, vol. 3n, CRC Press LLC, XP055605253.

*Primary Examiner* — Fayyaz Alam
(74) *Attorney, Agent, or Firm* — McBee Moore & Vanik IP, LLC

(57) ABSTRACT

The present disclosure relates generally to vegetation management and control, in particular, to vegetation data capture, maintenance workflow generation, prioritization, passive and continuous monitoring of vegetation, and predictive analysis for vegetation that may be within or adjacent to clearance zones for railway, transportation, utility, pipeline, range & pasture, and industrial sites.

11 Claims, 14 Drawing Sheets
(11 of 14 Drawing Sheet(s) Filed in Color)

(51) Int. Cl.
*G06K 9/62* (2006.01)
*G06N 5/04* (2006.01)
*G08B 21/18* (2006.01)

(52) U.S. Cl.
CPC ........... *G06K 9/6215* (2013.01); *G06N 5/048* (2013.01); *G08B 21/18* (2013.01)

(56) References Cited

U.S. PATENT DOCUMENTS

| | | | |
|---|---|---|---|
| 8,275,547 | B2 | 9/2012 | Rousselle et al. |
| 8,352,410 | B2 | 1/2013 | Rousselle et al. |
| 8,680,994 | B2 | 3/2014 | Leppanen et al. |
| 9,488,630 | B2 | 11/2016 | Coram et al. |
| 9,551,616 | B2 | 1/2017 | McQuilkin et al. |
| 2005/0104771 | A1 | 5/2005 | Terry et al. |
| 2010/0205219 | A1* | 8/2010 | Rousselle ............... G06Q 10/10 707/797 |
| 2012/0101861 | A1 | 4/2012 | Lindores |
| 2014/0257862 | A1 | 9/2014 | Billman et al. |
| 2016/0221592 | A1 | 8/2016 | Puttagunta et al. |
| 2017/0066459 | A1 | 3/2017 | Singh |
| 2018/0027725 | A1* | 2/2018 | Koutsorodi .......... A01B 79/005 |
| 2018/0049407 | A1 | 2/2018 | Castelli et al. |
| 2018/0098137 | A1* | 4/2018 | Saha ................. G06Q 10/06316 |
| 2018/0129879 | A1 | 5/2018 | Achtelik et al. |
| 2018/0218214 | A1* | 8/2018 | Pestun ................ G06K 9/00651 |
| 2018/0260626 | A1* | 9/2018 | Pestun ................. G08G 5/0086 |
| 2019/0096058 | A1* | 3/2019 | Fryshman ........... A01M 21/043 |
| 2019/0100310 | A1* | 4/2019 | Flood ................... G06K 9/3233 |
| 2019/0387687 | A1* | 12/2019 | Nitsch ................. A01M 7/0089 |
| 2019/0392211 | A1* | 12/2019 | Hartman ............ G06K 9/00671 |

FOREIGN PATENT DOCUMENTS

| | | |
|---|---|---|
| CN | 102393238 A | 3/2012 |
| CN | 107091636 A | 8/2017 |
| CN | 207020540 U | 2/2018 |
| CN | 107818561 A | 3/2018 |
| DE | 10002880 C1 | 6/2001 |
| EP | 1682852 A1 | 7/2006 |
| EP | 3276544 A1 | 1/2018 |
| JP | 2005189100 A | 7/2005 |
| JP | 2006085517 A | 3/2006 |
| WO | 9917606 A1 | 4/1999 |
| WO | 2016042320 A1 | 3/2016 |
| WO | 2016/118672 A2 | 7/2016 |
| WO | 2016/118672 A3 | 7/2016 |
| WO | 2017021753 A1 | 2/2017 |

* cited by examiner

VM Mobile App UI Examples

300

Clearance Zone Illustrations

Clearance Zone Illustrations

Clearance Zone Illustrations

INDUSTRIAL SITES

RANGE & PASTURE

SYSTEM AND METHOD FOR VEGETATION MANAGEMENT RISK ASSESSMENT AND RESOLUTION

CROSS-REFERENCE TO RELATED APPLICATIONS

This application is claims priority to U.S. Provisional Patent Application No. 62/676,302, filed 25 May 2018. The aforementioned application is incorporated herein by reference in its entirety.

BACKGROUND

Field

The present disclosure relates generally to vegetation management and control, in particular, to vegetation data capture, maintenance workflow generation, prioritization, passive and continuous monitoring of vegetation, and predictive analysis for vegetation that may be within or adjacent to clearance zones for railway, transportation, utility, pipeline, range & pasture, and industrial sites.

Description of Related Art

Vegetation management for clearance zones (railway, transportation, utility, pipeline, range & pasture, and industrial sites) requires a significant amount of time and resources. To clarify, transportation is to be used interchangeably with roads, railroads, roadsides, and/or roadways within this specification. Further, a "clearance zone" is defined as an area of terrestrial and/or riparian land where vegetation is removed either completely or selectively (e.g. removal of specific species or all vegetation growing above a specific height) to achieve specific management goals, including but not limited to the reduction of risk associated with the vegetation. Vegetation control provides a number of benefits to land managers and operators. For instance, improved sight distance for visibility of trains at railroad crossings, trees in close proximity to utility lines, flammable weeds growing near oil wells, or invasive brush growing in rangeland areas. Additionally, in a number of jurisdictions, vegetation clearance is required by law including (and not limited to) these agencies: Federal Railroad Administration (FRA), Federal Highway Administration, United States Department of Agriculture (USDA), and the Federal Energy Regulatory Commission.

Land managers and operators employ in-house and third-party vegetation control inspectors and engineers who implement vegetation control programs within designated clearance zones. These programs are very time and resource consuming, and are difficult to implement and keep up. Therefore, it would be desirable to have systems and methods that take into account at least some of these issues discussed above, as well as other possible issues.

BRIEF SUMMARY

In view of the foregoing background, example implementations of the present disclosure are directed to a new way for vegetation risk management assessment, monitoring, and resolution for designated clearance zones and other critical infrastructure, including in more particular examples, active and passive monitoring for the detection of vegetation growth obstructing or at-risk of obstructing a clearance zone, vegetation removal signifying easement encroachment issues or response to mitigative action of vegetation obstruction, incident reporting, risk assessment and determination, corrective action, and corrective action assessment. The present disclosure thus includes, without limitation, the following example implementations.

The primary objective of the invention is to provide a computer-implemented system and method for vegetation management risk assessment, monitoring and resolution, the system and method comprising of receiving data from active and passive monitoring collections of a vegetation risk. The term "vegetation risk" is being used to refer to any vegetation being located within or adjacent to a right-of-way and/or clearance zone or other critical infrastructure that may pose a risk to the operability of a vehicle, functionality of infrastructure, or safety of workers, passengers, and nearby persons and infrastructure. Further"vegetation risk" is also being used to refer to the data comprising images, video, telemetry data, GPS location, text, audio, and the like, characterizing the vegetation risk. Further, "vegetation risk" is also being used to refer to any vegetation located within or adjacent to a right-of-way and/or clearance zone whose presence could represent a risk to the productivity or utility of that land, an example being a poisonous or non-nutritious plants in a grazed rangeland or pasture. Further, "vegetation risk" is also being used to refer to any removal or other modification of vegetation located within or adjacent to a right-of-way and/or clearance zone or other critical infrastructure that signifies easement encroachment issues (i.e. removal of vegetation to build a structure) or response to mitigative action of vegetation obstruction. As it relates to monitoring, the term 'active' refers to data that is derived from direct human interaction such as but not limited to the identification of a vegetation risk and actively entering the data for system/platform consumption. The term 'passive' is used to identify data capture that does not require human interaction such as but not limited to data capture via a remote sensing mechanism or mechanisms to pass data or an outcome related to a vegetation risk. Further, the present invention optionally includes one or more systems and methods for uploading the active and/or passive data to a cloud computing system comprised of geospatial servers, database servers, and file servers. In one embodiment of the invention, as active and/or passive data is being uploaded, a data controller is continuously scanning the data to determine, based on set criteria, whether the vegetation requires immediate mitigation action prior to long term storage in the cloud computing system. The long term storage in the cloud computing system includes the ability to store the data for archival purposes and to recall the data as desired thereafter to track historically what data has been associated with the vegetation risk. The geospatial servers additionally provide the location for where the vegetation risk was observed. The set criteria for determining whether the vegetation requires immediate mitigation action can be simply user-defined or user-specified risk tolerance profiles. These may include for example proximity to critical infrastructure, density, frequency of occurrence, magnitude of change required before an alert message is sent or mitigation action is initiated. There is intended no limitation here and the criteria may be as complex and detailed as necessary to provide for effective management of the area of vegetation being managed. Alternatively, the criteria may derived from legal bases such as laws or regulations applicable to the area being managed, and those laws and/or regulations may include international, federal, state or local laws, regulations or statutes. Alternatively still, the criteria may be derived from industry or trade journals, standards or publications and/or may be derived from accepted practices that are applicable to the area where the vegetation is being managed. In yet another embodiment of the present invention, the criteria may be a blend of user specified risk tolerances/profiles, laws, regulations, statutes, industry, trade or other publications or standards applicable to the area of vegetation that is being managed. The criteria may be used to establish an alert system which may range from a single alert to a hierarchy of alerts, and it may also be used to establish the point at which action is taken, and that too may range from a single notice to a hierarchy of stages for how often and how intense the call for action is to manage the risk in the area being managed. The criteria may further be adapted to call for specific action to be taken. For example, the criteria may call for action ranging from a one time simple spraying with an appropriate herbicide to a call for an entire work crew to address the risk, as for example, where the identified risk is a fallen tree or other obstruction calling for a full work crew.

After the data or outcome is stored in the cloud computing system, it may optionally be used in conjunction with data feeds from public, private, and/or governmental agencies for further analysis and manipulation by end-users or other business logic processors. Further, the active and passive data uploaded, as well as, the data feeds from public, private, and/or government agencies are optionally combined and used as input into a web application, where an end-user can view the vegetation risk, associated attribute data, images, video, audio, and/or geospatial maps that identify the location and context of the vegetation risk. Geospatial data is information that describes the location and attributes of things and has some spatial component to it. The geospatial maps may additionally include related geospatial layers including but not limited to one or more of weather data, wetlands, water features, vegetation layout, land cover type, satellite imagery, historic application data and the like to assist in management and assessment activities related to mitigation strategies for the vegetation risk. Further, in the same implementation of the invention, the web application, receiving status input from executed mitigation strategies on the vegetation risk, alerts the end-user of the completion status and other metrics regarding the vegetation risk and execution strategy. The system and method of the present invention also leverages input data to predict and identify future risk throughout time. Predictive analytics or predictive data refers to learning algorithms that predict vegetation progression and/or regression relative to the clearance zone, provide insights towards identifying the escalation of risk in relation to the clearance zone, and/or provide insights for management urgency and prioritization. Further, predictive analytics or predictive data can be based on or otherwise utilize active data, passive data, historical data, previously predictive data or combinations thereof. This interactive platform, based on mobile and web interactive interfaces, enabled by a cloud data server backend, and supported by computer-based algorithms and artificial intelligence, is herein referred to as the 'digital risk platform'.

The current state of the art of management of vegetation incidents in clearance zones ranges broadly, includes many partners and lacks consistent communication and tracking mechanisms, and it is a goal of the present invention to overcome these limitations. For example, in the current state of the art in railroad vegetation management, personnel report vegetation incidents in a variety of manners (verbally, voicemail, email, text) to a vegetation manager which makes it difficult for them to log, track progress, assign work orders to responsible parties and learn from the incidents to modify future management practices. Railroad personnel provide a subjective evaluation of the risk of the incident (type of vegetation, size of vegetation, intensity of vegetation, location to clearance zone) which can result in either an overestimation of risk, which causes wasted resources as responsible parties prioritize to address the incident or an underestimation of risk, which causes the railroad to be exposed to additional liability and fines by regulators due to noncompliance with Federal regulations. Railroad personnel approximate the location of incidents using the mile markers on the tracks which results in difficulties re-locating a reported incident for evaluation and resolution by the assigned party. Additionally, railroad personnel and the vegetation manager lack any clarity on the timeline for corrective action, if the incident has already been reported by another person, what corrective action was taken and why the incident occurred.

Currently, railroad personnel report incidents via methods described above with the information indicated and then the vegetation manager contacts the parties responsible for vegetation management on that track to conduct a site visit to evaluate and correct the issue. This process could occur over multiple visits and months due to the lack of clarity on the incident details and the inability to properly evaluate the risk present for the correct level of urgency. Once the responsible party corrects the issue, there are inconsistent processes to inform the railroad personnel or the vegetation manager. If railroad personnel have a question on the status of an incident, they have to contact the vegetation manager who then has to contact the responsible party to report this status. This check-in may take several days for the communication to go from the railroad to the person in the responsible party's team doing the work on the track, and then pass the communication back through all in the communication chain to get to the person that asked the question.

The current ad-hoc risk notification and reporting processes are not satisfactory since they do not support the urgency, timeliness and reliability required for incident resolution to a standard measure of risk or compliance with Federal regulations. Additionally, the current processes are labor intensive and cause an increase in administrative work by all involved in the process to forward or pass along information. This example in railroad vegetation management is not unique and the challenges faced are also experienced in roadside, utility, pipeline, range & pasture, and industrial site management.

At the end of any year of vegetation management in the current state of the art, there is neither a consolidated list of incidents with location nor documentation of how incidents were resolved for the purpose of learning to inform the next year's management plan. The current state of the art lacks the ability to benchmark the efficacies of the vegetation treatments and work order management (planned vs actual) to evaluate effectiveness to provide insights to guide future management decisions. For example, railroad work orders are created to treat complete sections of track, however, conditions on the track (such as pedestrians, construction, or parked rail cars on neighboring side track) often prevent complete fulfillment of the planned work order. These "skipped" segments of track have a higher probability of a vegetation risk occurring due to lack of treatment. The system provides visibility into the "skipped" segments of track to drive proactive work order generation to mitigate potential vegetation risk before they occur. Historically vegetation incidents in unidentified "skipped" segments of track lead to incorrect evaluation of vegetation treatment efficacy. It is an attribute of the present invention that is provides an understanding of the spatial relationship with these "skipped" segments, vegetation incidents, and treatment applications to now allow for proper efficacy determination and work order process evaluation.

The present invention creates a standardized reporting system on the digital risk platform that provides a transparent, real-time solution that allows for a standardized reporting method for consistent risk evaluation and urgency classification, clarity on what the incident is by providing media support (pictures, video, etc) paired with GPS location(s) or map to show its relative location along with standardized classification criteria to allow for rapid, reliable incident assessment and consistent escalation where significant risks are present. The digital risk platform comprises digital electronics including, but not limited to, one or more of mobile devices, servers, computers, and other ancillary connected equipment communicating via a communication network, either wired or wireless, in order to connect the various hardware devices, components and software, and to compute the processes and algorithms supporting the requirements stated above. Determination of risk varies in and around clearance zones. Some selected examples of significant risk are: vegetation obstructing a motor vehicle's line-of-sight vision to be able to see oncoming trains and railroad equipment at a crossing resulting in accidents and other risks when that line-of-sight is not sufficient; vegetation in close proximity to energized powerlines where power arcs to the vegetation resulting in blackouts and/or fires; undesirable vegetation in a range and pasture setting that adversely affects the growth and well-being of livestock or increases the risk of fire; and dried vegetation on an oil refinery site that increases the risk of fire hazard. Algorithms are used in the present invention for processing the active and passive input data, validating the risk categorization and automatically routing the incident using established and learned rules. This solution of the present invention bridges communications gaps between the clearance zone managers, relevant stakeholders and all contractors or other personnel working in and around the clearance zone allowing all involved to see real-time incident status and the ability to provide input on an incident until resolved. Additionally, this solution of the present invention provides a visual representation of incidents at the end of a selected interval, (for example, a treatment year or season), to facilitate the review, evaluation and/or modification of management practices (for example, efficacy of vegetation management) in the future, (for example, in the following treatment year or season). Several advantages of the present invention are readily apparent, including but not limited to being able to proactively identify and mitigate risks and decrease the time taken by all to manage the totality of incidents.

In some example implementations of the present invention, there is provided a system comprised of a digital risk platform to validate risk classification for proper routing, rules that escalate in a consistent manner incidents to facilitate the urgency of resolution and leverage data input to consistently and reliably predict, identify and mitigate future risk.

Features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

BRIEF DESCRIPTION OF THE DRAWING(S)

The patent or application file contains at least one drawing executed in color. Copies of this patent or patent application publication with color drawings(s) will be provided by the Office upon request and payment of the necessary fee. Having thus described the disclosure in general terms, reference will now be made to the accompanying drawings, which are not necessarily drawn to scale, and wherein.

DETAILED DESCRIPTION

Figure 1A:
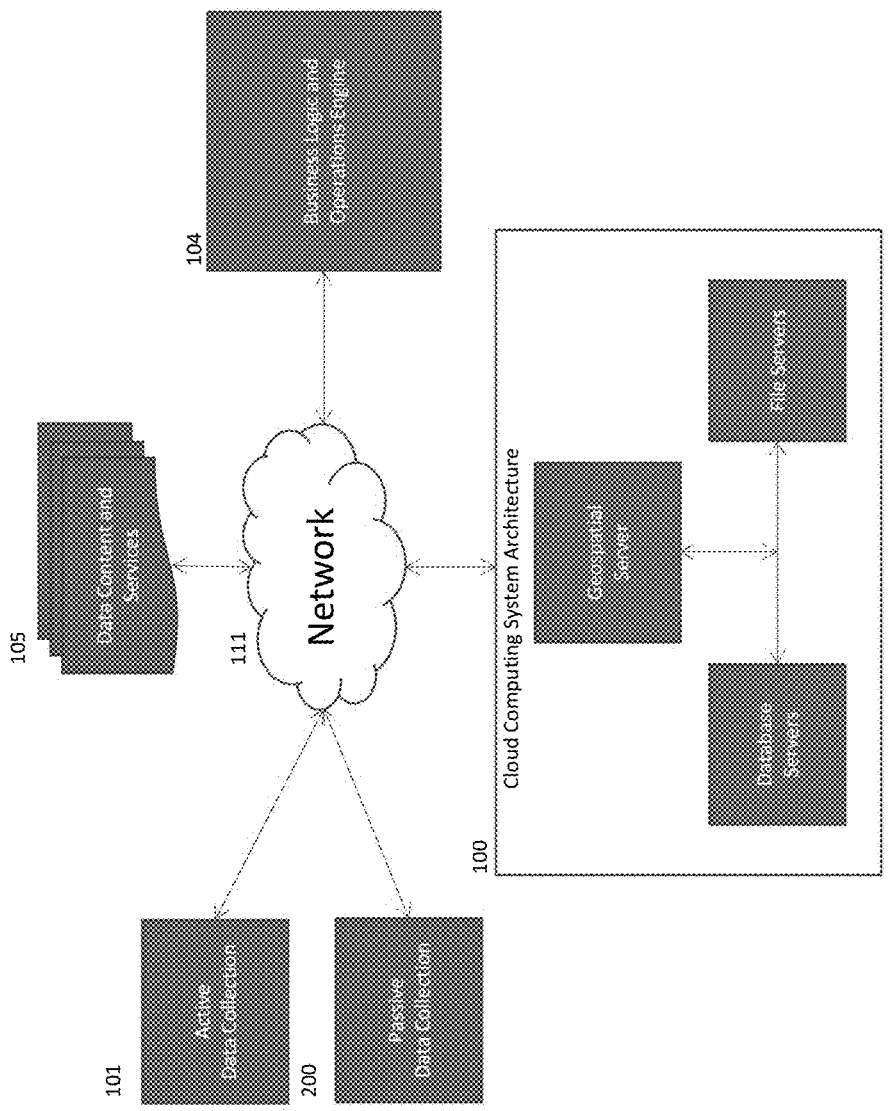
FIG. 1A is a block diagram illustration of the systems architecture of the vegetation management risk assessment and resolution components, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. As used herein, for example, the singular forms "a," "an," "the" and the like include plural referents unless the context clearly dictates otherwise. The terms "data," "information," "content", "outcome" and similar terms may be used interchangeably, according to some example implementations of the present invention, to refer to data capable of being transmitted, received, operated on, and/or stored. Also, for example, reference may be made herein to quantitative measures, values, relationships or the like. Unless otherwise stated, any one or more if not all of these may be absolute or approximate to account for acceptable variations that may occur, such as those due to engineering tolerances or the like. Like reference numerals refer to like elements throughout.

Figure 1B:
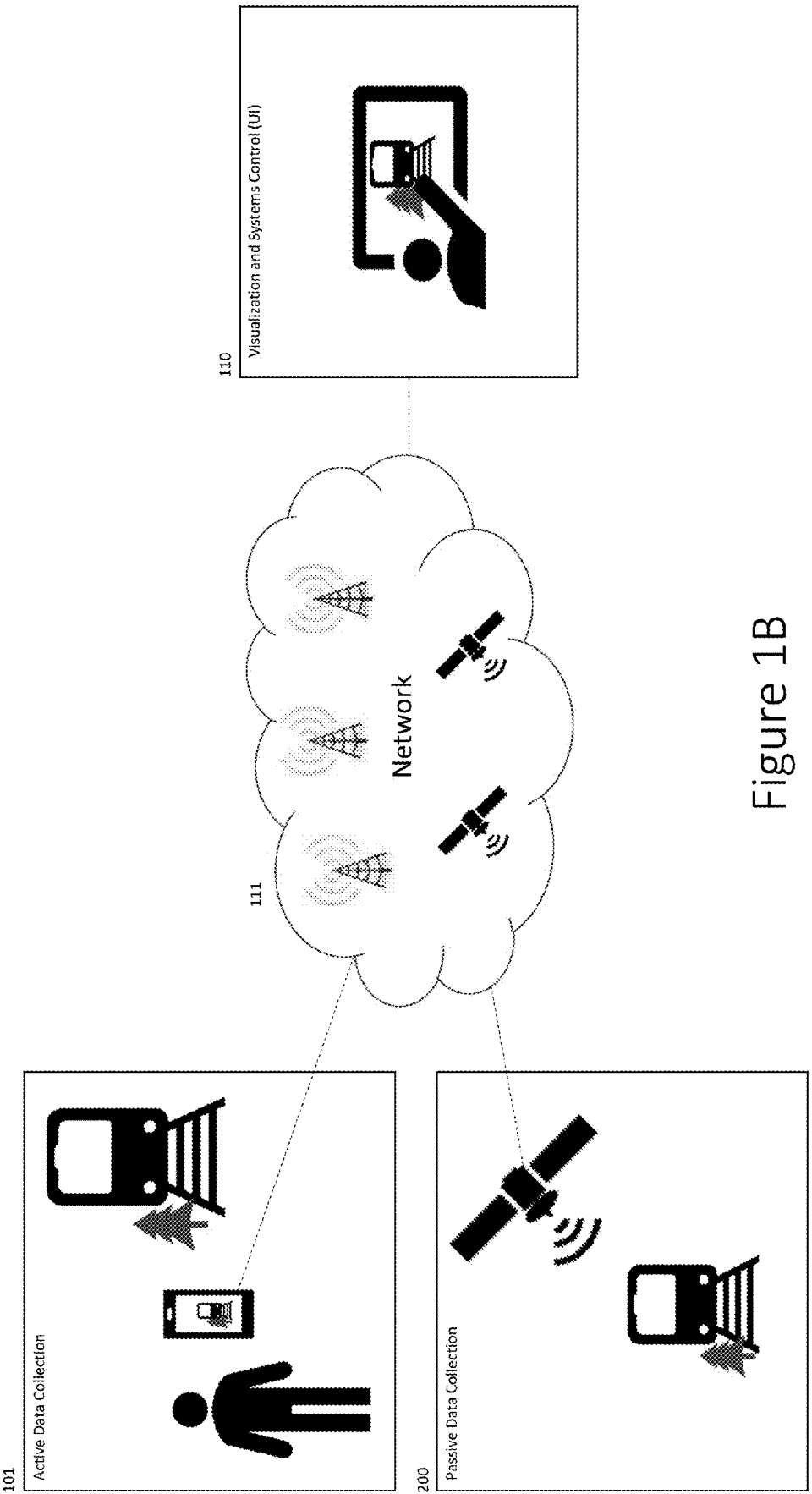
FIG. 1B is an iconic illustration of the systems architecture, according to an example implementation of the present disclosure.

FIGS. 1A and 1B illustrate one example of a vegetation management risk assessment and resolution system architecture for a computer-implemented method. As shown, the central portion of the system architecture may be implemented with an Internet-based cloud computing system architecture 100, including a computer network or a number of interconnected computer networks in or over which a number of systems, data feeds, devices, computers and the like communicate or otherwise operate. As shown in the illustration, the types of devices and/or inputs connected to the cloud computing architecture 100 include active data collection device 101, which in one embodiment may be a mobile device, data content and services 105, and business logic and operations engine 104. In another example, the business logic and operations engine may be included in the cloud computing system architecture. Although shown and described herein in the context of Internet-based cloud computing system architecture 100, it should be understood that the system may be implemented with any of a number of different network-based architectures including implementation as a stand-alone system connected or disconnected from a computer network.

The network 111 may be implemented as one or more wired networks, wireless networks or some combination of wired and wireless networks. The network may include private, public, academic, business or government networks, or any of a number of different combinations thereof, and in the context of an Internet-based cloud computing architecture, includes the Internet. The network may support one or more of any of a number of different communications protocols, technologies or the like, such as cellular telephone, Wi-Fi, satellite, cable, digital subscriber line (DSL), fiber optics and the like.

The systems and computers connected to the network 111 may also be implemented in a number of different manners. The active device data collection process 101 may be implemented by any number or type of preferably portable device(s), (e.g., laptop computer, tablet computer), mobile phone (e.g., smartphone, cellular phone), wearable computer (e.g., smartwatch, optical head-mounted display), specialized mobile sensing and compute device (e.g., dashcam, LiDaR), or the like, with which a mobile application may be installed onto the internal memory of the device. The mobile application is used to provide a graphics user interface (GUI) for a user to collect data of vegetation risks that are within or adjacent to clearance zones or other relevant objects of interest. The data collected by user input is stored on the mobile device's internal memory and the type of data collected as part of the active device data collection 101 includes images, video, text, audio, GPS location, and other metadata associated of the vegetation risk. The device 101 may or may not be connected to a wireless communications network at the time of data collection. If the device 101 is not connected to a wireless communications network at time of data collection, the device's internal memory will be used as the storage medium for the data of the vegetation risk until the device becomes connected to the network 111. Once the device 101 is connected to a wireless communication network, the data collected from the device data collection 101 of vegetation risks will be uploaded to the cloud computing system architecture 100, such as the file servers, databases, and/or geospatial data and processing servers.

Figure 1C:
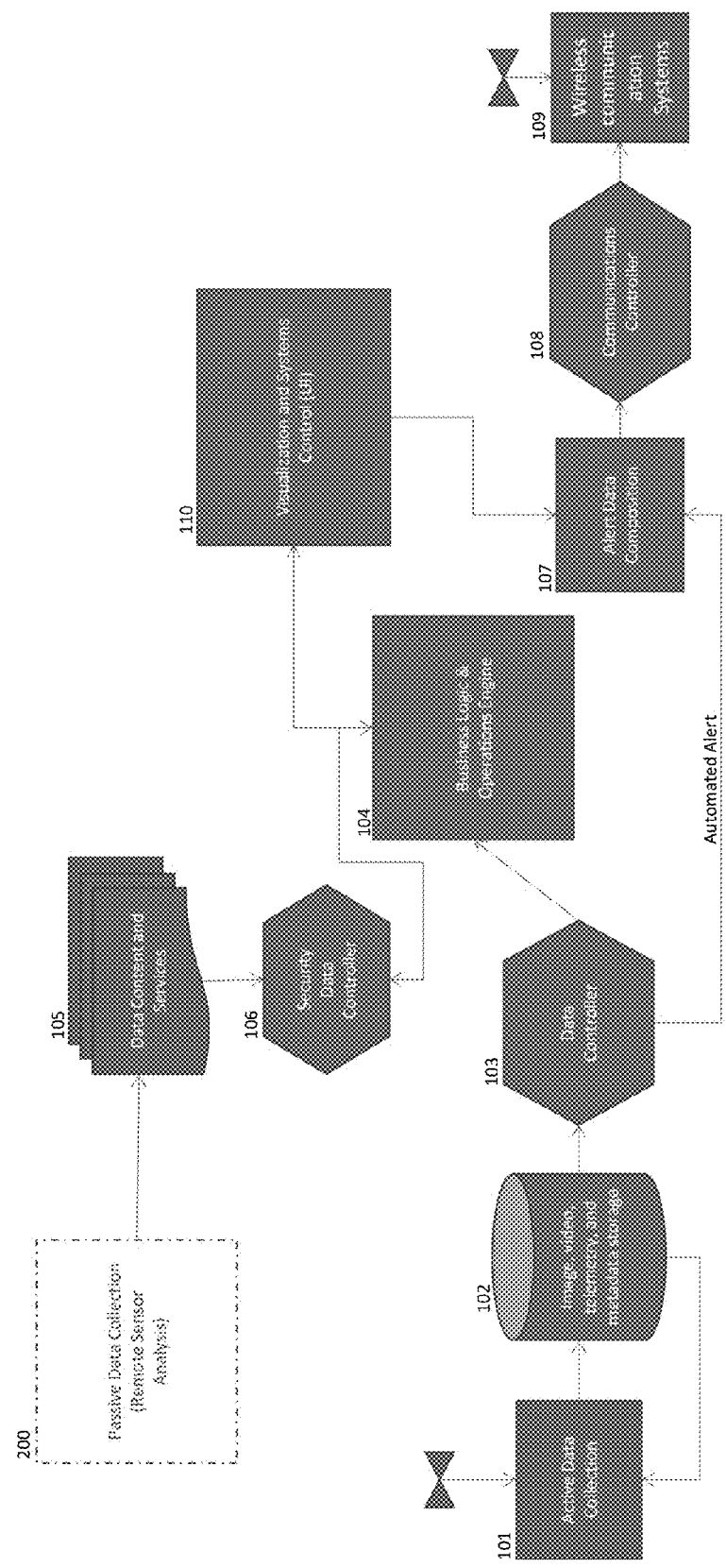
FIG. 1C is a block diagram illustration of the vegetation management risk assessment and resolution algorithm flow chart, according to example implementations of the present disclosure.

FIG. 1C illustrates the vegetation management risk assessment and resolution algorithm flow chart, wherein it depicts in an example implementation the flow of data outlined in the system architecture FIG. 1A. As stated above, data is collected from devices in the device data collection 101 process of a vegetation risk and is stored on the device's 101 internal memory. The data, such as, images, video, text, audio, GPS location, and other metadata associated with the vegetation risk, are then uploaded, upon connection to a wireless communication network, to long term storage in the image, video, telemetry, and metadata storage 102 database(s) such that the data may now be stored on either the mobile device and/or in the cloud computer system architecture's 100 file servers, geospatial servers, and/or databases.

The data stored in the image, video, telemetry, and metadata storage 102 associated with the vegetation risk is continuously scanned by a data controller 103 to determine if the combination of attribute information meets any one of a set criteria that would trigger an instruction to be executed to route the data associated with the vegetation risk directly to the alert data composition 107 processor for alert notification processing and dissemination to specified users via a communications controller 108 and wireless communications system 109. The alert generated by the alert data composition 107 and delivered to the end user may be as simple as a notification that identifies the geolocation and its proximity to the clearance zone at which the portable device collects data of the vegetation risk within the clearance zone. Other relevant information such as vegetation object severity, height, species, location within or adjacent to the clearance zone and the type of hazard imposes may also be provided. The alert may indicate the type of vegetation. The alert may provide an alert rating for the detected vegetation based on its proximity to the clearance zone, such as in order of closest proximity, "severe," "high" or "moderate." An example that would trigger the data controller 103 to send an automated alert to the alert data composition module 107 would be a severe vegetation risk, such as a tree trunk obstructing the pathway of a railroad track, attribute information within the dataset may be any combination of an image of the tree trunk obstructing the railroad track, the location of the obstruction along the track, the hazard type being "obstruction of railroad track" or similar, and a very high alert rating. The data controller module 103 would scan the dataset and upon detecting a vegetation risk having a hazard type of "obstructing the railroad track" or similar and having a very high alert rating would automatically execute instructions to send the dataset associated with the vegetation risk to the alert data composition module 107 for alert notification processing and dissemination.

Furthermore, in FIG. 1C an example implementation of the vegetation management risk assessment and resolution method, the data content and services 105 connects to various data feeds for data consumption and downstream processing. The data content and services 105 receives data from data feeds and content generators from public, private, and/or government agencies. In an example implementation, the data feeds and content generators may include data associated with infrastructure data, weather and climate data, topographic and digital terrain data, landcover data, land use information data, satellite imagery, aerial imagery, unmanned aerial vehicle (UAV) imagery, and light detection and ranging (LIDAR) data. Additionally, LIDAR data may be acquired from overhead platforms or from transportation traversing vehicles. Further, the data content and services module 105 receives transformed and classified image data from the remote sensor analysis process 200.

Furthermore, in FIG. 1C an example implementation of the vegetation management risk assessment and resolution method, a business logic and operations engine 104 along with a visualization and systems control user interface (UI) 110 consumes data from the data content and services module 105, through a security data controller 106. The security data controller 106 verifies that end users have the appropriate permissions to view the various data content and data feeds from the data content and services module 105.

End users will be restricted to see only proprietary data associated with their domain and credentials. The visualization and systems control (UI) 110 may be a web application in an example implementation where the web application can be viewed on a mobile device, laptop, or desktop computer system and which allows end users to view vegetation risk data that has been collected by the mobile device data collection 101 and related geospatial data and topographical layers from the data content and services module 105. The business logic and operations engine (BLOE) 104 is connected to and consumes data from the data content and services module 105 and the mobile device collection module 101. The BLOE is a business process management system that allows for the addition, changing or evolution of business logic/management criteria and is the centralized location to route all business decisions. The identification of the GPS location, vegetation object photograph, severity, height, species, clearance zone location and the type of hazard to support the risk evaluation and urgency classification to meet the management goals set forth in the vegetation management specification for a site. The BLOE assesses multiple variables for the risk evaluation and urgency classification. For example, in the case of a railway corridor found in FIG. 5B, a one-foot vegetation object is identified in the clearance zone 500 at a road crossing 501 location and will be considered a line of sight obstruction by FRA if it is greater than two feet in height. The system will assess the urgency of remediation based on the immediate and future risk of the vegetation to avoid a violation. Using the same one-foot vegetation object that is identified outside of the road crossing location could grow to two feet in height and not be considered an FRA violation, therefore not posing the same level of risk, however, if left unmanaged would continue to grow increasing the risk of a trip and fall hazard or fire hazard. Depending upon the vegetation object features that are captured and the inputted management profiles, the system dynamically assesses current and future risk to drive management decisions for remediation or transparency of the risk.

Furthermore, in FIG. 1C an example implementation of the vegetation management risk assessment and resolution method, the alert data composition 107 module may have two paths for an alert notification to be generated, first, as described above is from the data controller 103 upon detecting data from the mobile device data collection 101 meeting a set of criteria, second, as an alert that can be sent manually from the visualization and systems control (UI) 110 based on user input and the desired alert notification to be composed and disseminated. Additionally, in the example implementation, after the alert notification is composed by the alert data composition 107 processor, the alert notification is passed to the communications controller 108 for packaging and distribution. The communications controller 108 prepares the alert notification to send through to the wireless communication system 109 to ensure proper propagation and acceptance by end user devices, such as mobile, laptop, or desktop computer across any variety of network and/or wireless devices and utilizing any variety of standard protocols, such as internet protocol, bluetooth protocol, email protocols, file transfer protocol, and the like.

Figure 2:
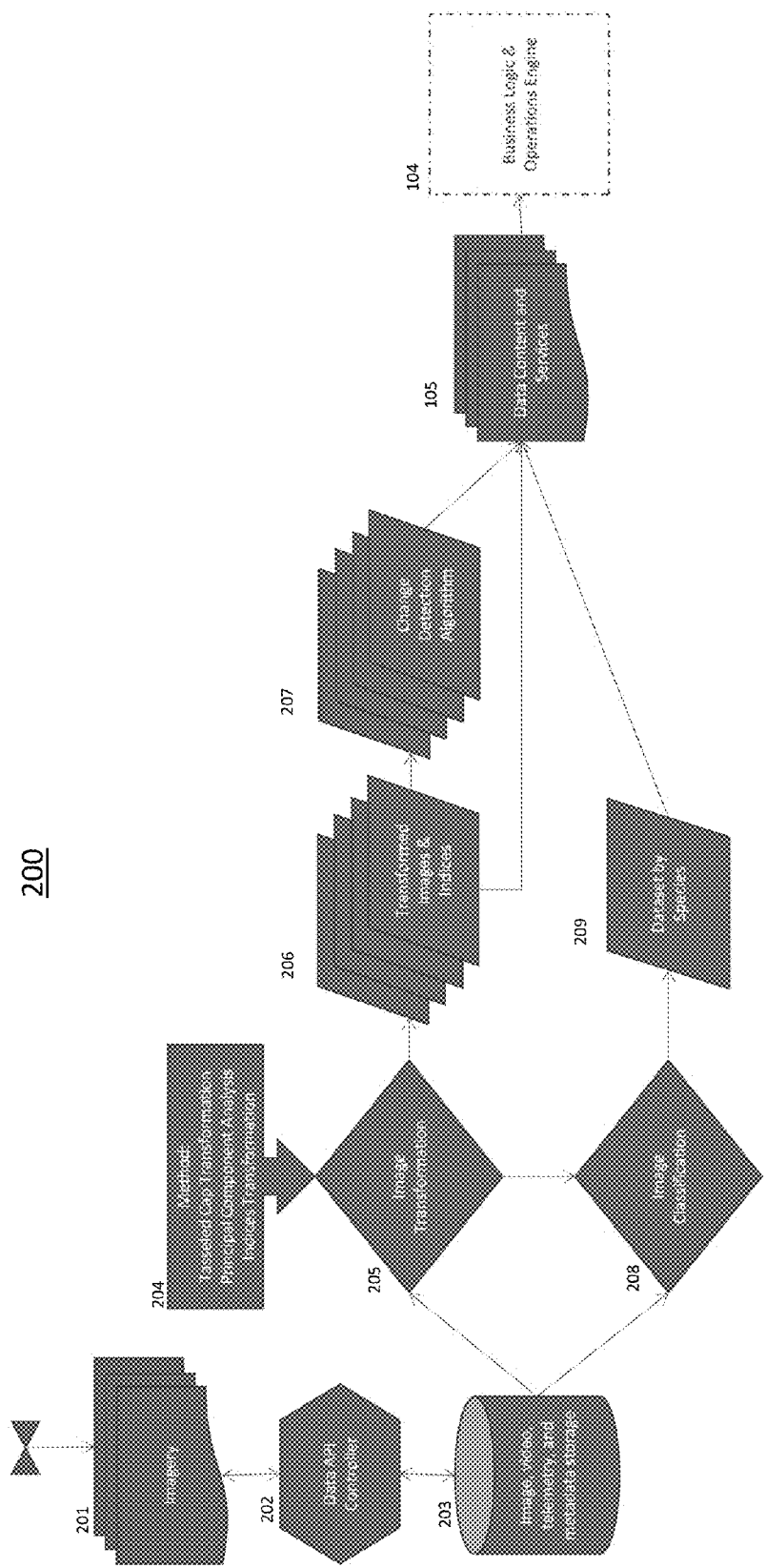
FIG. 2 is a block diagram illustration of the remote sensor analysis algorithm flow chart, according to some example implementations of the present disclosure.

FIG. 2 is an illustration of an example implementation of a passive data collection remote sensor analysis algorithm flow chart 200 that provides the data content and services 105 with key data from remote sensor images and the subsequent classification and transformation of the said remote sensor images for input into the business logic and operations engine 104 for predictive analysis, preventative maintenance, and associated mitigation strategies. The flow chart begins with receiving imagery 201 from a variety of sources such as, satellite, aerial, UAV, LIDAR, and ground based for processing by the data application programming interface (API) controller 202. The data API controller 202 controls the requests and receiving of imagery data from the imagery 201 module and thus from a variety of outside sources. The data is stored in image, video, telemetry, and metadata storage 203 devices such as, databases, file servers, and/or geospatial servers where the location of the image, video, telemetry, and metadata storage 203 may be physically located in a cloud computing system architecture 100 but may also reside at the edge point of the collection of the data. By edge point it is meant that at least some of the decisions and computations utilized in the present invention are conducted and/or processed close to the geospatial location where it is needed.

As shown in FIG. 2, images stored in the image, video, telemetry, and metadata storage 203 go through a series of transformation processes in the image transformation 205 module. In the example implementation, the image transformation 205 uses standard Tasseled Cap Transformation, Principal Component Analysis, indices transformation, and/or other data transformation techniques to convert the raw image data into useful transformed images for geospatial vegetation mapping. As mentioned above, the image transformation uses specific industry standard techniques, however, this should not be construed to limit the transformation to only those techniques outlined, and any number of analyses including one or all of computer vision techniques, image processing techniques, machine-learning techniques, and others may be used to accomplish image transformations to derive information about the environment and objects captured by various imagery 201 sensor sources. The transformed images are then stored in the transformed images and indices 206 module ready to be received by the data content and services 105, additionally, they are ready to be processed by the change detection algorithm module 207. The change detection algorithm module compares images from two or more time periods and calculates points and/or areas of statistically significant change. These points and/or areas are then ready to be received by the data content and services 105.

As shown in FIG. 2, images stored in the image, video, telemetry, and metadata storage 203 may also go through an image classification 208 process where the various vegetation images will be classified to determine the type and species of the vegetation. As the images may need to be transformed first prior to being classified in the image classification 208 process, images from both the image transformation 205 process and the image, video, telemetry, and metadata storage may go through the image classification 208 module. The classified images are then stored in a dataset by species 209 module and ready to be received by the data content and services 105. As stated above, in this example implementation, the entire remote sensor analysis flow provides a means to transform and classify images to determine geospatial vegetation mapping and/or vegetation species for predictive analysis, preventative maintenance, and associated mitigation strategies.

Through a combination of active and passive data collection, reference data (including historic information), remote sensing and other spatial layers, the system analyzes and predicts the risk a vegetation object imposes within or adjacent to a clearance zone throughout time. For example, a vegetation object identified on the edge of a clearance zone could pose only a potential or moderate risk; however, if mitigative action is not taken, it has the potential to pose a greater risk as the vegetation progresses towards the infrastructure. Over time, the system analyzes and predicts trends through learning algorithms to predict vegetation progression towards the infrastructure, provides insights towards identifying the escalation of risk in relation to the infrastructure, and provides insights for management urgency and prioritization.

Figure 3:
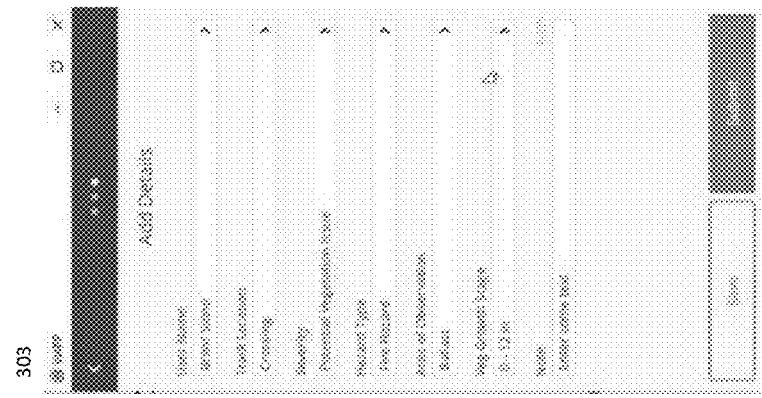
FIG. 3 is an illustration of an example implementation of the vegetation risk assessment and resolution mobile application user interfaces.
Figure 3:
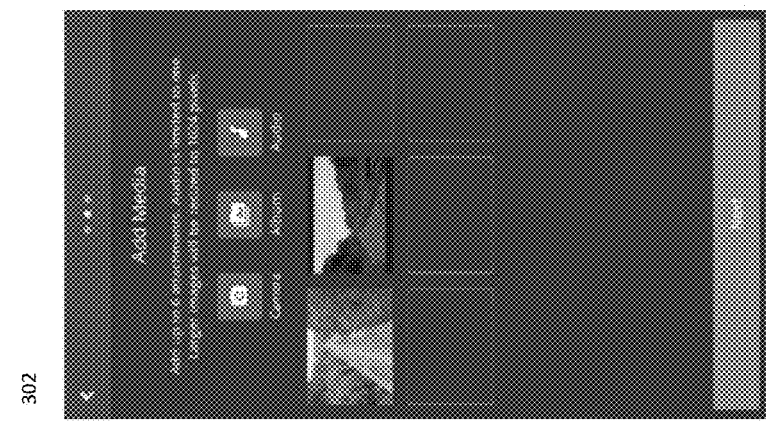
Figure 3:
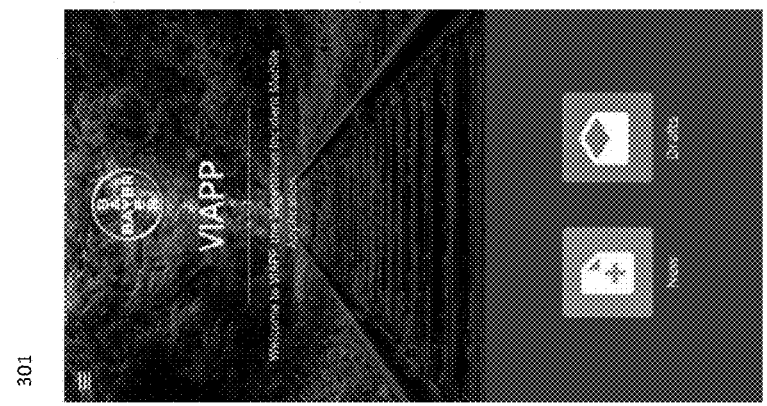

FIG. 3 illustrates an example implementation of the vegetation management risk assessment and resolution mobile application graphical user interfaces 300, specifically interfaces 301, 302 and 303.

Figure 4A:
FIGS. 4A through 4F are illustrations of an example implementation of the vegetation risk assessment and resolution web application user interfaces.
Figure 4B:
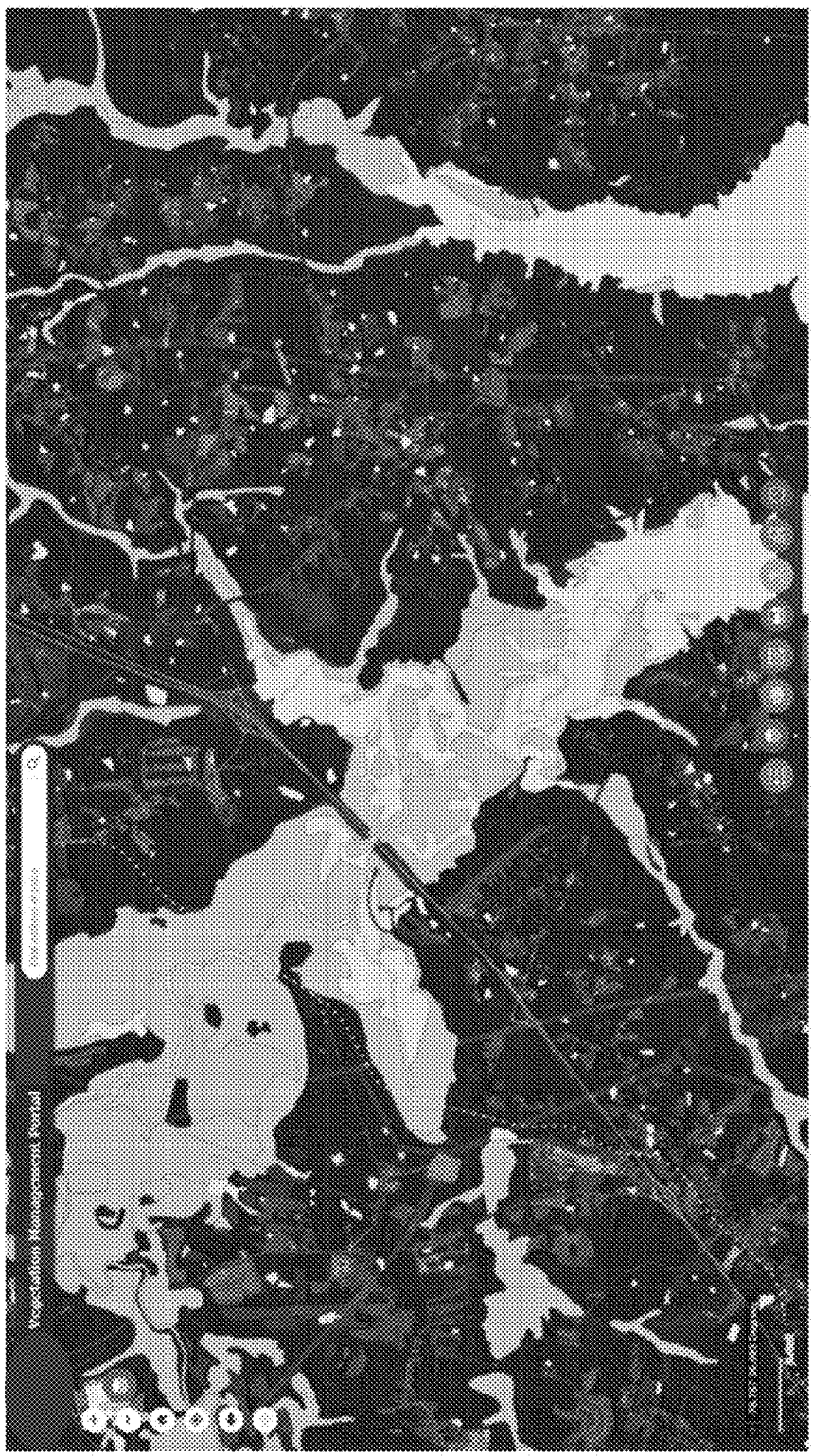
Figure 4C:
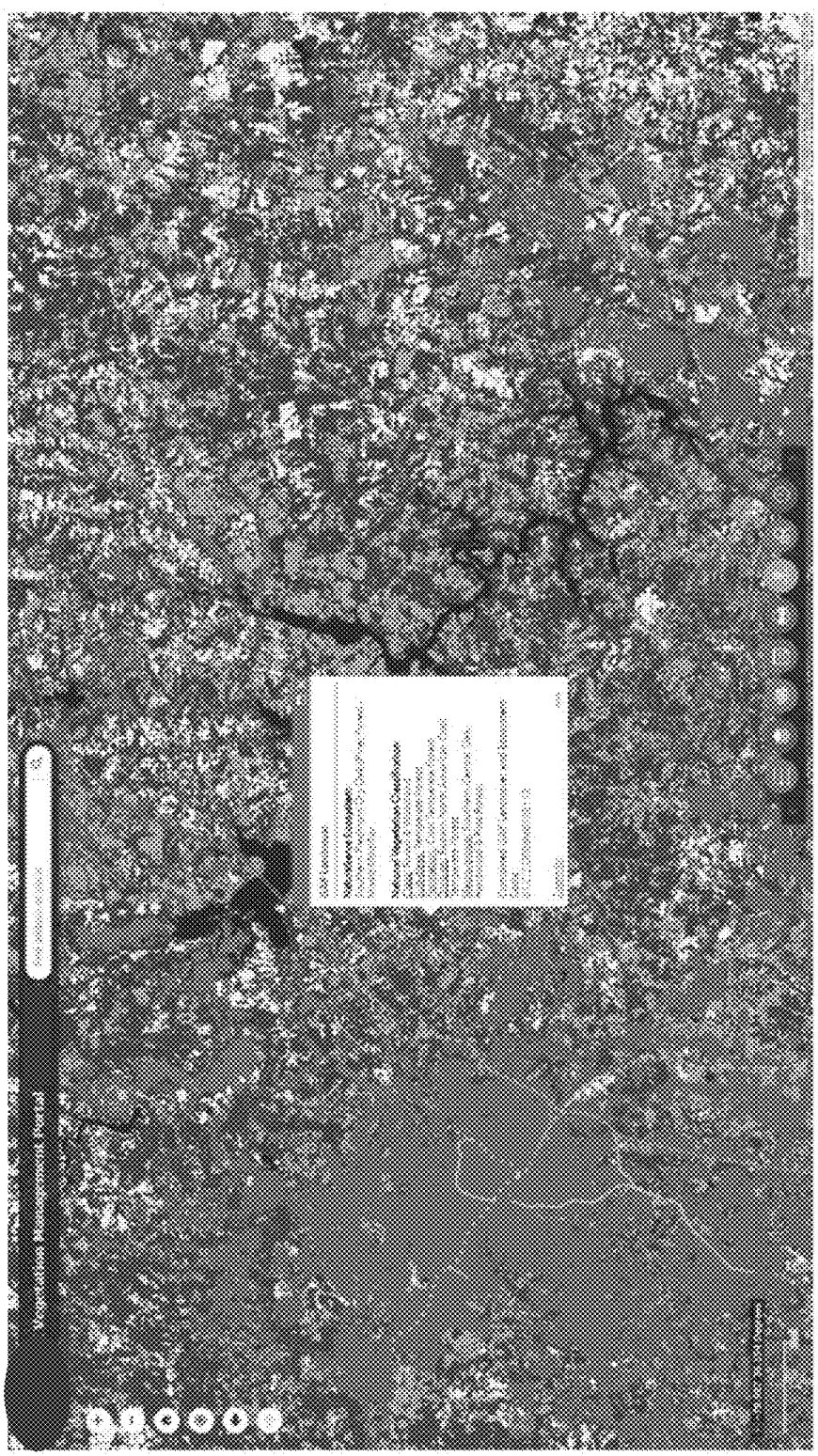
Figure 4D:
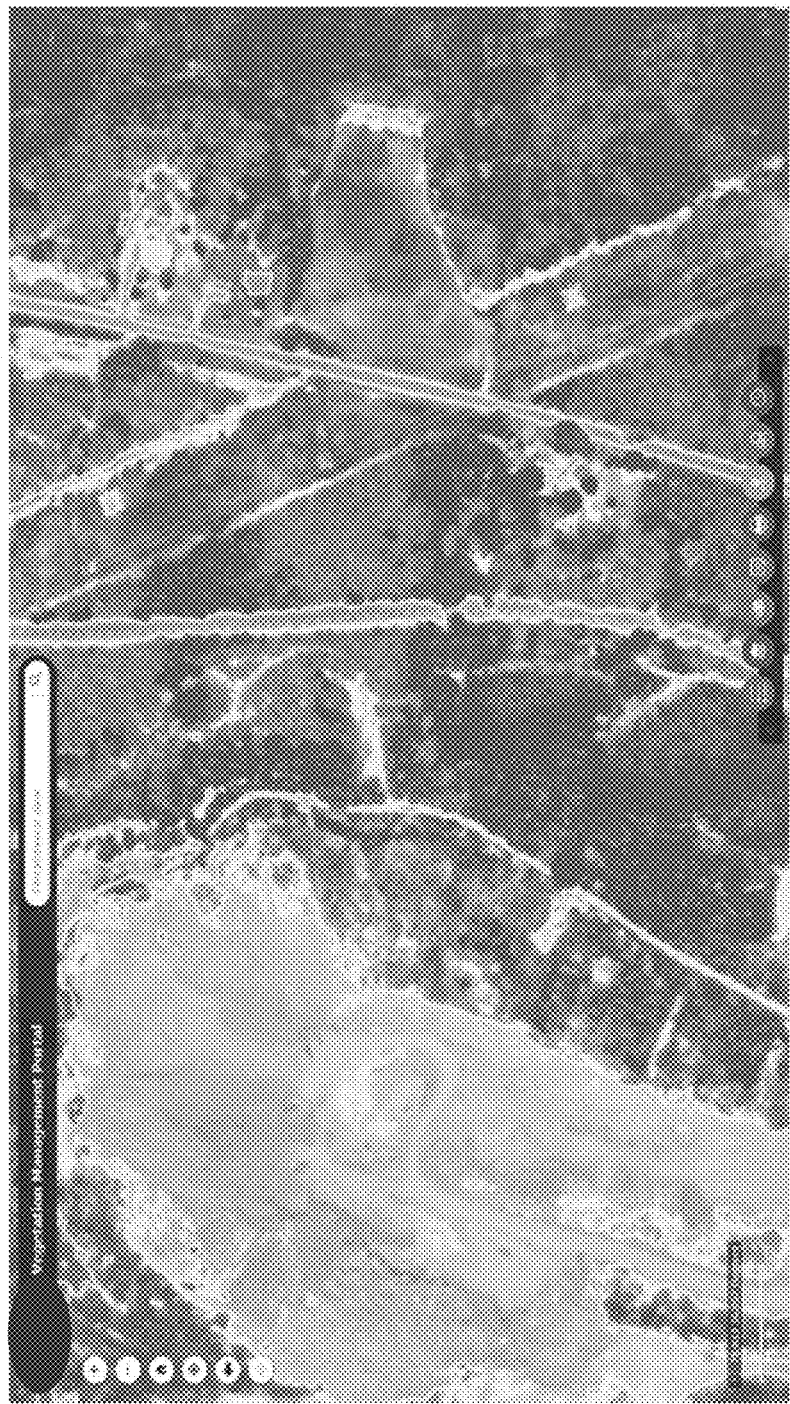
Figure 4E:
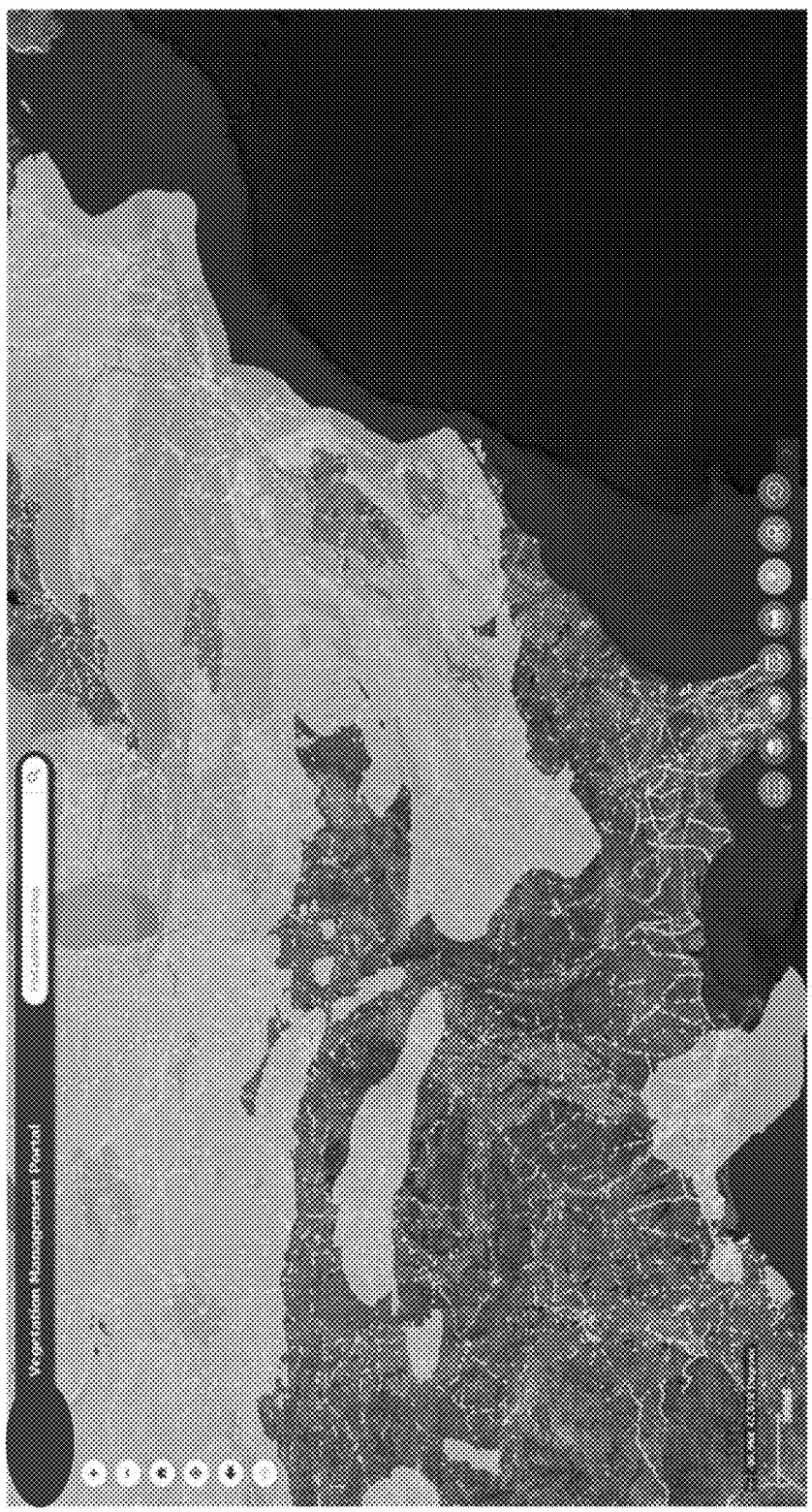
Figure 4F:
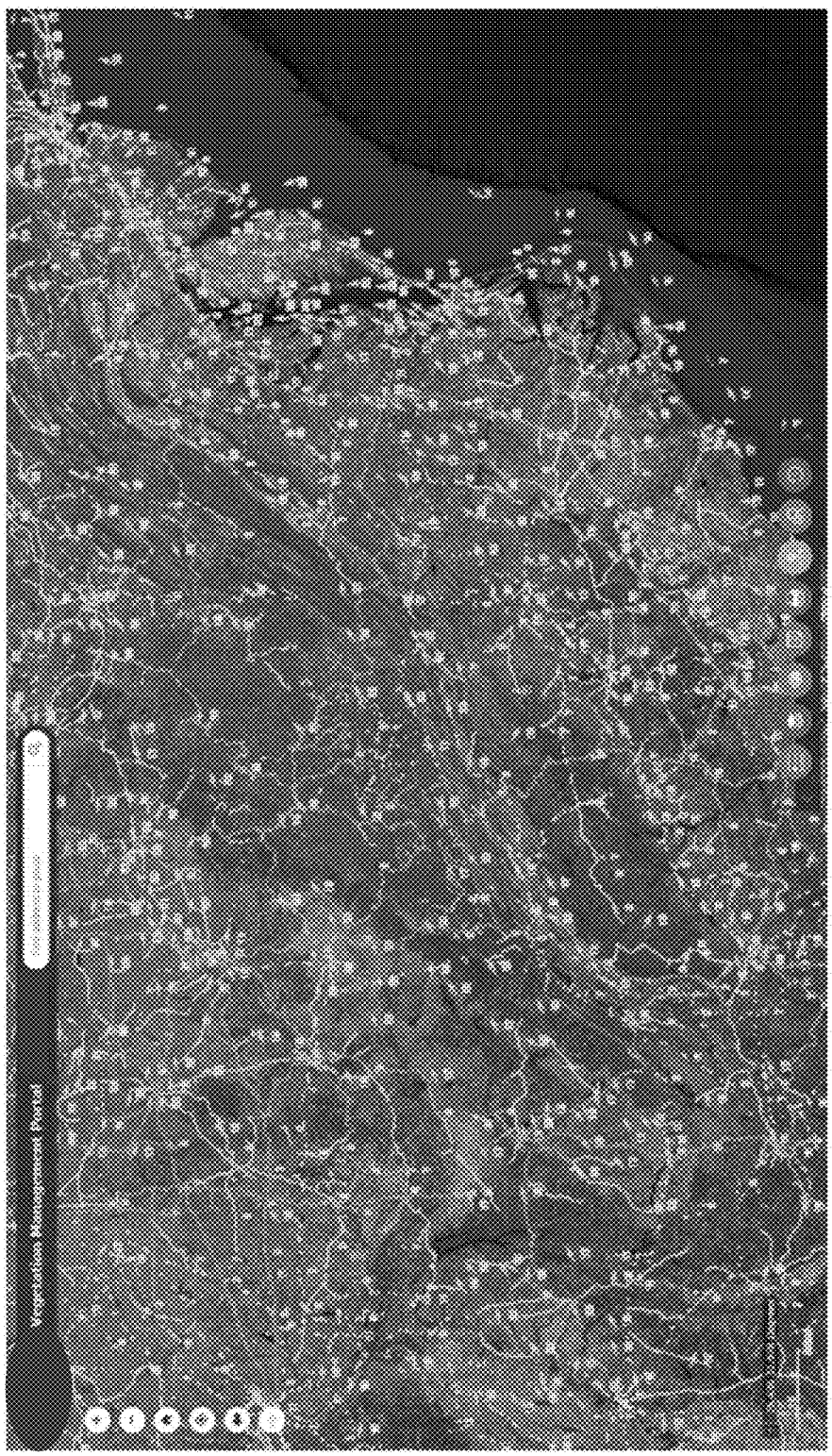

FIG. 4A-F illustrates an example implementation of the vegetation management risk assessment and resolution web application graphical user interfaces 400. FIG. 4A illustrates one example of user interface 400 for the main landing page for the web application. FIGS. 4B-4F illustrates different geospatial layers that are used to analyze efficacy of vegetation treatment applications. FIG. 4B shows examples of where wetlands intersect right of way corridors (i.e. railway, transportation, utility, pipeline, etc.). Managing vegetation with chemicals is regulated by the Environmental Protection Agency (EPA) and there are site specific use instructions for both terrestrial and aquatic environments therefore, spatially overlaying wetlands and application data provides insights to vegetation management techniques near these corridor and wetland intersections insuring correct labeled product usage. FIG. 4C illustrates a landcover layer that provides spatial reference and descriptive data for characteristics of the land surface such as thematic class (for example, urban, agriculture, and forest), percent impervious surface, and percent tree canopy cover. These characteristics will provide insights to business logic and operations engine for the determination of risk and urgency classification. FIG. 4D illustrates a Normalized Difference Vegetation Indices, which quantifies vegetation by measuring the difference between near-infrared (which vegetation strongly reflects) and red light (which vegetation absorbs). NDVI is used in this system for identifying change detection of vegetation intrusion into the clearance zone which triggers a notification for a site survey to provide additional data for further analysis by the BLOE. FIGS. 4E and 4F illustrate weather layers that are updated every hour. Historical and current weather data are important variable in understanding vegetation treatment efficacy. This analysis then provides a guideline for optimum weather conditions to apply future treatments and understand efficacy of historic treatments.

Figure 5A:
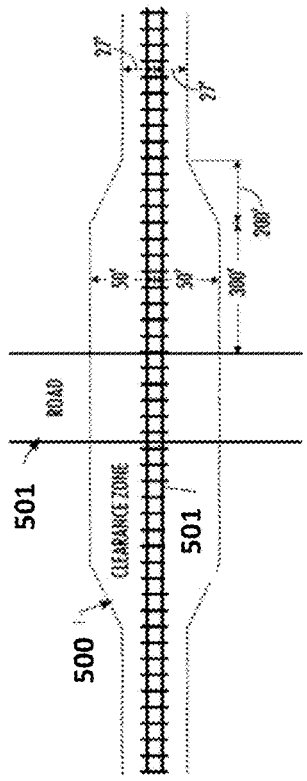
FIGS. 5A through 5L illustrate forward and top views of clearance zones for railway, roadside, utility, pipeline, range & pasture, and industrial sites.
Figure 5C:
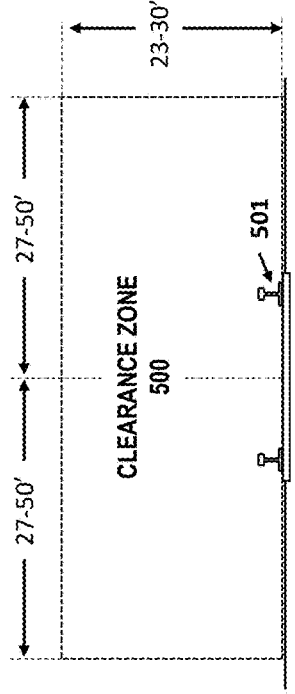
Figure 5B:
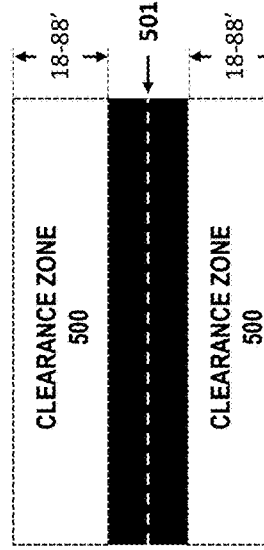
Figure 5D:
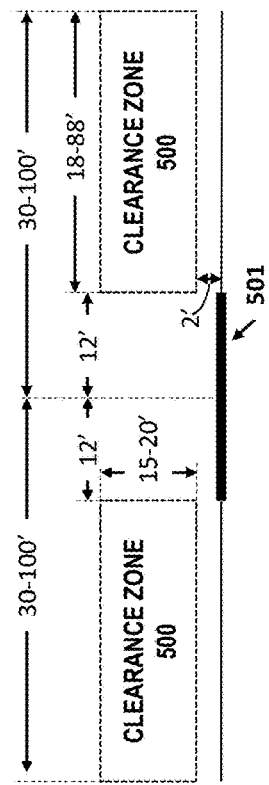
Figure 5E:
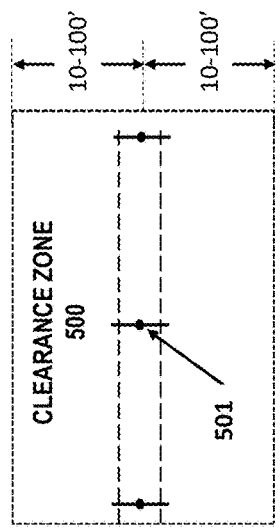
Figure 5G:
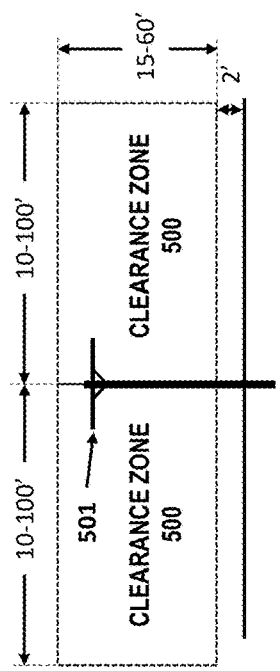
Figure 5F:
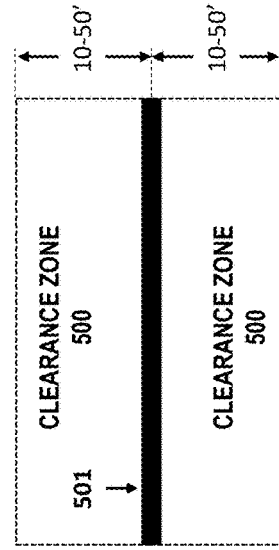
Figure 5H:
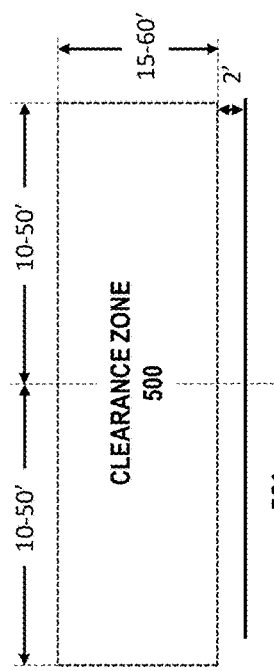
Figure 5J:
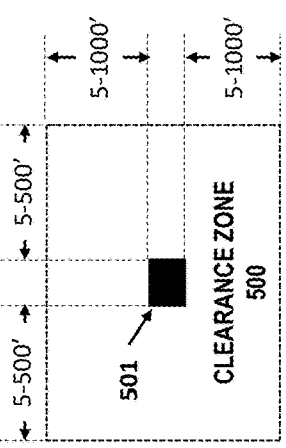
Figure 5I:
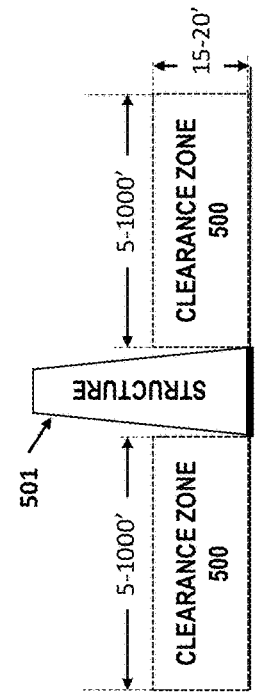
Figure 5L:
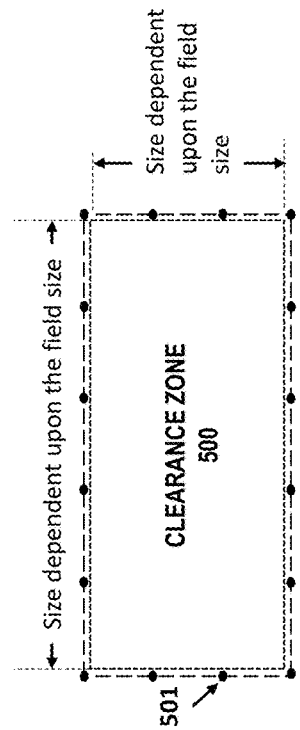
Figure 5K:
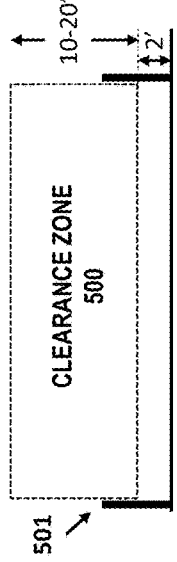

FIGS. 5A-5L provide example views of clearance zones 500 and respective infrastructure 501 for railway, roadside, utility, pipeline, range & pasture, and industrial sites. Clearance zone specifications can vary based upon customer specifications. FIGS. 5A and 5B represent a three-dimensional clearance zone defined from the infrastructure (such as track and roads) 501, extending a distance on either side of the centerline of the track, and a distance above the track. FIGS. 5A and 5B also illustrate forward and top views of a clearance zone 500 around a straight section of railroad track, according to some example implementations. FIGS. 5C and 5D illustrate forward and top views of the clearance zone for roadside, according to some example implementations. FIGS. 5E and 5F illustrate forward and top views of the clearance zone for utility corridors. FIGS. 5G and 5H illustrate forward and top views of the clearance zone for pipeline corridors. FIGS. 5I and 5J illustrate forward and top views of the clearance zone for industrial sites. FIGS. 5K and 5L illustrate forward and top views of the clearance zone for range & pasture sites.

The distances shown in FIGS. 5A through 5L are by example and should not be taken to limit the scope of the present disclosure as the appropriate distances will be defined at the time of implementation of the invention.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

As explained above, the present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method to create a real-time standardized vegetation management efficacy assessment system comprising:
   collecting vegetation surface data;
      wherein the vegetation surface data comprises images, video, text, audio, GPS location, description, and/or combinations thereof;
   assessing treatment application efficacy that statistically or relatively compares one or more aspects of pre and post-treatment vegetation conditions via a digital risk platform;
   comparing, by means of overlaying geospatial data with clearance zone and/or right-of-way surface data to the vegetation surface data to determine the location of vegetation objects that are within or adjacent to the clearance zone and/or right-of-way, thus identifying a vegetation object of interest;
   predicting vegetation progression and/or regression of the vegetation object of interest relative to an infrastructure using machine learning;

assessing work order efficacy that statistically combines treatment application efficacy with planned and actual work order completion via the digital risk platform;

assessing post-treatment vegetation risk along corridor segments that statistically compares the rate of vegetation recovery in treated areas via the digital risk platform where automation of an alert signifying the geospatial location where a change has occurred is ranked by end user criteria, said end user criteria being selected as one or more of the group consisting of severity, proximity to critical infrastructure, density, frequency of occurrence, and magnitude of change;

wherein historical input data and output generated are used to forecast future vegetation risk and prioritization of management practices based on end user specified risk tolerance profiles;

reporting of one or more vegetation risks as they are discovered via the digital risk platform;

implementation of a standardized risk evaluation and urgency classification determination, via an algorithm that processes critical attributes to validate a risk categorization;

automatically routing an incident to the end user based one or more criteria established by the standardized risk evaluation and urgency classification, via the digital risk platform for creation and execution of a mitigation execution strategy.

2. The method of claim 1, wherein the critical attributes processed by the algorithm include severity, height, species, location within or adjacent to the clearance zone and the type of hazard the risk imposes.

3. The method of claim 1, wherein the routing information associated with the one or more vegetation risks uses the GPS location to show the relative location of a vegetation object and classification criteria for rapid incident assessment and escalation where significant risks are present.

4. A system for the evaluation and mitigation of intrusive vegetation in or proximate a target area comprising:
at least one cloud-based computer network;
a business logic and operations engine;
at least one active data collection subsystem including:
at least one active data collector;
at least one data storage module communicatively connected to said at least one active data collector and containing criteria comprising at least one vegetative intrusion limit; and
at least one data controller communicatively connected to said at least one data storage module and said business logic and operations engine and wherein said at least one data controller preferably continuously scans said at least one data storage module to determine if said at least one vegetative intrusion limit is exceeded;
wherein active data comprises vegetative growth in or proximate said target areas, direct user action, mitigation actions, and predictive data;
wherein the predictive data is data generated by machine learning using learning algorithms that predict vegetation progression and/or regression relative to the clearance zone;
at least one passive data collection subsystem including:
at least one passive data collector;
at least one data content module communicatively connected to each of said at least one passive data collector and wherein said at least one data content module receives passive data from said at least one data collector and from a plurality of data content generators;
at least one security data controller communicatively connected to each of said at least one passive data collector wherein said at least one security data controller verifies each of one or more end users are permitted to access passive data and wherein said at least one security data collector is communicatively connected to said business logic and operations engine;
a visualization display unit communicatively connected to said business logic and operations engine wherein said permitted end users may view said active data and said passive data;
an alert data composition module operatively connected to said data controller and said visualization display unit wherein said alert data composition module generates at least one alert notification based on said active data from said at least one active data controller and/or said passive data from said visualization display and/or predictive data;
a communications controller operatively connected to said alert data composition module wherein said communications controller distributes said at least one alert notification; and,
a wireless communication system communicatively connected to said communications controller wherein said wireless communication system capable of transmitting said at least one alert notification to said end users;
wherein when present, said at least one alert notification integrates said active and/or passive data and initiates one or more actions to mitigate said vegetative intrusion into said target area.

5. The system of claim 4, wherein said passive data includes imagery of said target area from one or more of satellite, aerial, drone, LIDAR, and/or ground based sensors.

6. The system of claim 4, further comprising at least one visual data transformation module wherein imagery data is transformed into images for geospatial vegetation mapping and communicated to a data services module wherein said data services module is communicatively connected to said business logic and operations module.

7. The system of claim 4, wherein said alert notification includes one or more of vegetation species, vegetation height, vegetation density, location relative to said target area and/or type of hazard in or proximate to said target area.

8. The system of claim 4, wherein said at least one cloud-based computer network comprises file servers, geospatial servers and/or databases.

9. The system of claim 4, wherein said at least one cloud-based computer network includes a plurality of cloud-based computer networks.

10. The system of claim 4, wherein said visualization display unit includes one or more applications selected from a web application and a mobile application, wherein said active data and said passive data is displayed and accessed by said permitted end users.

11. The system of claim 4, wherein said target area is within, encompasses or is adjacent to a clearance zone and wherein said visualization unit displays compose a three-dimensional display in or around said clearance zone or a subpart thereof.

* * * * *